US009672215B2

(12) United States Patent
Chirayath et al.

(10) Patent No.: US 9,672,215 B2
(45) Date of Patent: *Jun. 6, 2017

(54) DATABASE STORAGE RECLAIMING PROGRAM

(71) Applicant: INTERNATIONAL BUSINESS MACHINES CORPORATION, Armonk, NY (US)

(72) Inventors: Vinod P. Chirayath, Austin, TX (US); Gary T. Gong, Fremont, CA (US); Salvador Ledezma, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/331,929

(22) Filed: Oct. 24, 2016

(65) Prior Publication Data
US 2017/0031941 A1    Feb. 2, 2017

Related U.S. Application Data

(63) Continuation of application No. 15/211,168, filed on Jul. 15, 2016, now Pat. No. 9,558,219, which is a continuation of application No. 14/696,639, filed on Apr. 27, 2015.

(51) Int. Cl.
*G06F 17/30* (2006.01)

(52) U.S. Cl.
CPC .. *G06F 17/30138* (2013.01); *G06F 17/30303* (2013.01)

(58) Field of Classification Search
None
See application file for complete search history.

(56) References Cited

U.S. PATENT DOCUMENTS

| 5,832,522 A | 11/1998 | Blickenstaff et al. |
| 7,143,108 B1 | 11/2006 | George |
| 7,389,305 B1 | 6/2008 | Kindig et al. |

(Continued)

OTHER PUBLICATIONS

Dutta et al., "STORM: An Approach to Database Storage Management in Data Center Environments," Cluster Computing and the Grid, 2007, Seventh IEEE International Symposium, 11 pages.

(Continued)

*Primary Examiner* — Son T Hoang
(74) *Attorney, Agent, or Firm* — Kristofer L. Haggerty

(57) ABSTRACT

The computer retrieves a list of the data elements contained in a database. The computer performs a static and dynamic analysis on the list to determine which data elements have been active in a static or dynamic Structured Query Language (SQL) statement, then removes active data elements from the list. The computer performs a dependency test to determine which data elements on the list are depended on by data objects not on the list and removes those data elements which are depended on. The computer analyzes application code to extract SQL statements and determine whether data elements on the list are active in application code SQL. Any data elements on the list which are active in application code SQL are removed from the list and the remaining data elements on the list are sorted in descending order based on size.

1 Claim, 3 Drawing Sheets

(56) References Cited

U.S. PATENT DOCUMENTS

| | | | |
|---|---|---|---|
| 8,473,915 B2* | 6/2013 | Brodsky | G06F 11/3676 |
| | | | 707/713 |
| 8,626,729 B2 | 1/2014 | Whitehead et al. | |
| 9,052,942 B1* | 6/2015 | Barber | G06F 9/4843 |
| 9,251,184 B2* | 2/2016 | Harris | G06F 17/30297 |
| 2006/0048129 A1* | 3/2006 | Napier | G06F 8/62 |
| | | | 717/168 |
| 2012/0179728 A1 | 7/2012 | Harris | |
| 2014/0229429 A1 | 8/2014 | Bestgen et al. | |

OTHER PUBLICATIONS

Dutta et al, "Workload-Based Generation of Administrator Hints for Optimizing Database Storage Utilization," ACM Transactions on Storage, vol. 3, No. 4, Article 16, Feb. 2008, pp. 16-16:28.

IBM: List of IBM Patents or Patent Applications Treated as Related (Appendix P), Nov. 7, 2016, pp. 1-2.

Chirayath et al., Pending U.S. Appl. No. 14/696,639, filed Apr. 27, 2015, titled "Database Storage Reclaiming Program," pp. 1-27.

Chirayath et al., Pending U.S. Appl. No. 15/211,168, filed Jul. 15, 2016, titled "Database Storage Reclaiming Program," pp. 1-21.

Chirayath et al., Pending U.S. Appl. No. 15/331,930, filed Oct. 24, 2016, titled "Database Storage Reclaiming Program," pp. 1-21.

* cited by examiner

DATABASE STORAGE RECLAIMING PROGRAM

TECHNICAL FIELD

The present invention relates generally to database storage, and more particularly to reclaiming database storage.

BACKGROUND

Database storage can be expensive to purchase, maintain, and house. Often times as new business models are integrated into the database design, the data elements that have become redundant or stale are seldom removed and needlessly consume storage in the database. This may be due to factors such as complexity of the database, staff turnover, unfamiliarity with the data model, and uncertainty as to whether data elements can be removed safely without affecting applications or workloads. Current methods to reclaim database storage include multi-temperature database storage in which database systems manage storage by ranking rows, or records, of data based on their use, including factors such as frequency of access, age, volatility, and importance of query performance. Multi-temperature storage systems may store frequently used data into hot storage, or fast and expensive storage, while data not frequently used is stored in cold storage, or slower and less expensive storage. The problem with multi-temperature storage is that while an entire row, or record, may be considered hot data, some data elements of the record may not be used as frequently as the data elements meriting the record designation in hot storage. For example, a Department of Motor Vehicles database may contain information on the registered vehicles of a state. A vehicle record may include hot, or frequently accessed, data such as make and model, but it also may include cold, or less frequently accessed, data such as engine type. Because the record is a single entity, not only is the hot data such as vehicle make and model stored in hot storage, but the cold data such as engine type as well.

SUMMARY

Embodiments of the present invention disclose a method, system, and computer program product for a database storage reclaiming system. The computer retrieves a list of the data elements contained in a database. The computer performs a static and dynamic analysis on the list to determine which data elements have been active in a static or dynamic Structured Query Language (SQL) statement, then removes active data elements from the list. The computer performs a dependency test to determine which data elements on the list are depended on by data objects not on the list and removes those data elements which are depended on. The computer analyzes application code to extract SQL statements and determine whether data elements on the list are active in application code SQL. Any data elements on the list which are active in application code SQL are removed from the list and the remaining data elements on the list are sorted in descending order based on size.

DETAILED DESCRIPTION

Embodiments of the present invention will now be described in detail with reference to the accompanying figures.

Figure 1:
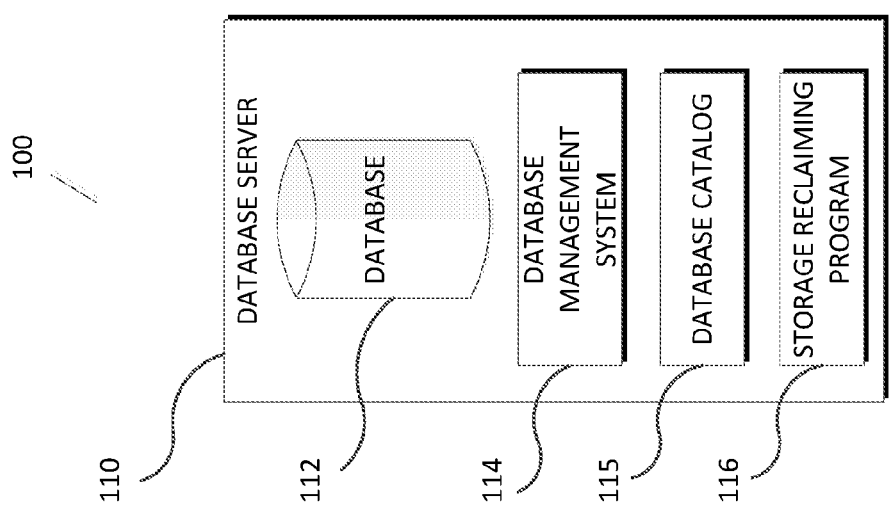
FIG. 1 illustrates a database storage reclaiming system, in accordance with an embodiment of the invention.

FIG. 1 illustrates a database storage reclaiming system 100, in accordance with an embodiment of the invention. In the example embodiment, the database storage reclaiming system 100 includes database server 110.

Database server 110 includes database 112, database management system 114, database catalog 115, and storage reclaiming program 116. In the example embodiment, database server 110 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While database server 110 is shown as a single device, in other embodiments, database server 110 may be comprised of a cluster or plurality of computing devices, working together or working separately. Database server 110 is described in more detail with reference to FIG. 3.

Database 112 is an organized collection of data stored on hard disk space. In the example embodiment, database 112 is stored locally on database server 110, however in other embodiments database 112 may be stored remotely and accessed via a network.

Database management system (DBMS) 114 is a computer software application that interacts with users via a user interface, other applications, and database 112 to capture and analyze data. DBMS 114 is designed to facilitate the definition, creation, is querying, update, and administration of databases. In the example embodiment, database management system 114 is associated with database 112 and is stored locally on database server 110. In other embodiments, database management system may be stored remotely and communicated with via a network.

Database catalog 115 is a collection of metadata which stores the definitions of the objects contained in database 112. In the example embodiment, the metadata contained in database catalog 115 identifies all of the data elements contained in database 112 as well as the relationships the data elements may have with other objects. In other embodiments, however, database catalog 115 may contain metadata defining other information about data elements in database 112. In the example embodiment, database catalog 115 is stored locally on database server 110, however in other embodiments, database catalog 115 may be stored remotely and accessed via a network.

Storage reclaiming program 116 is a software program on database server 110 capable of scanning database catalogs, such as database catalog 115, in order to populate a list of candidates for deletion. Storage reclaiming program 116 is additionally capable of performing a static analysis of a database by reviewing the static Structured Query Language (SQL) statements and removing any data elements from the list which were used in a static SQL statement within a relevant period of time. Structured Query Language, or SQL, is a special purpose programming language designed for managing data held in a relational database management system, such as DBMS 114. Storage reclaiming program 116 is further capable of performing a dynamic analysis of a database by monitoring the database for a relevant period of time and removing any data elements used in dynamic SQL statements within that relevant period of time from the list. Storage reclaiming program 116 is additionally capable of performing an impact and dependency analysis of a database by determining whether a data element on the list of candidates for deletion has a relationship with another object and, if a relationship exists, removing the data element from the list. Storage reclaiming program 116 is additionally capable of determining whether any data elements on the list of candidates for deletion are found in program application codes and, if the data element is used in a program application code, removing the data element from the list. Storage reclaiming program 116 is capable of sorting the remaining data elements on the list of candidates for deletion by size. While storage reclaiming program 116 is stored locally on database server 110 in the example embodiment, storage reclaiming program 116 may be stored remotely and accessed via a network in other embodiments.

Figure 2:
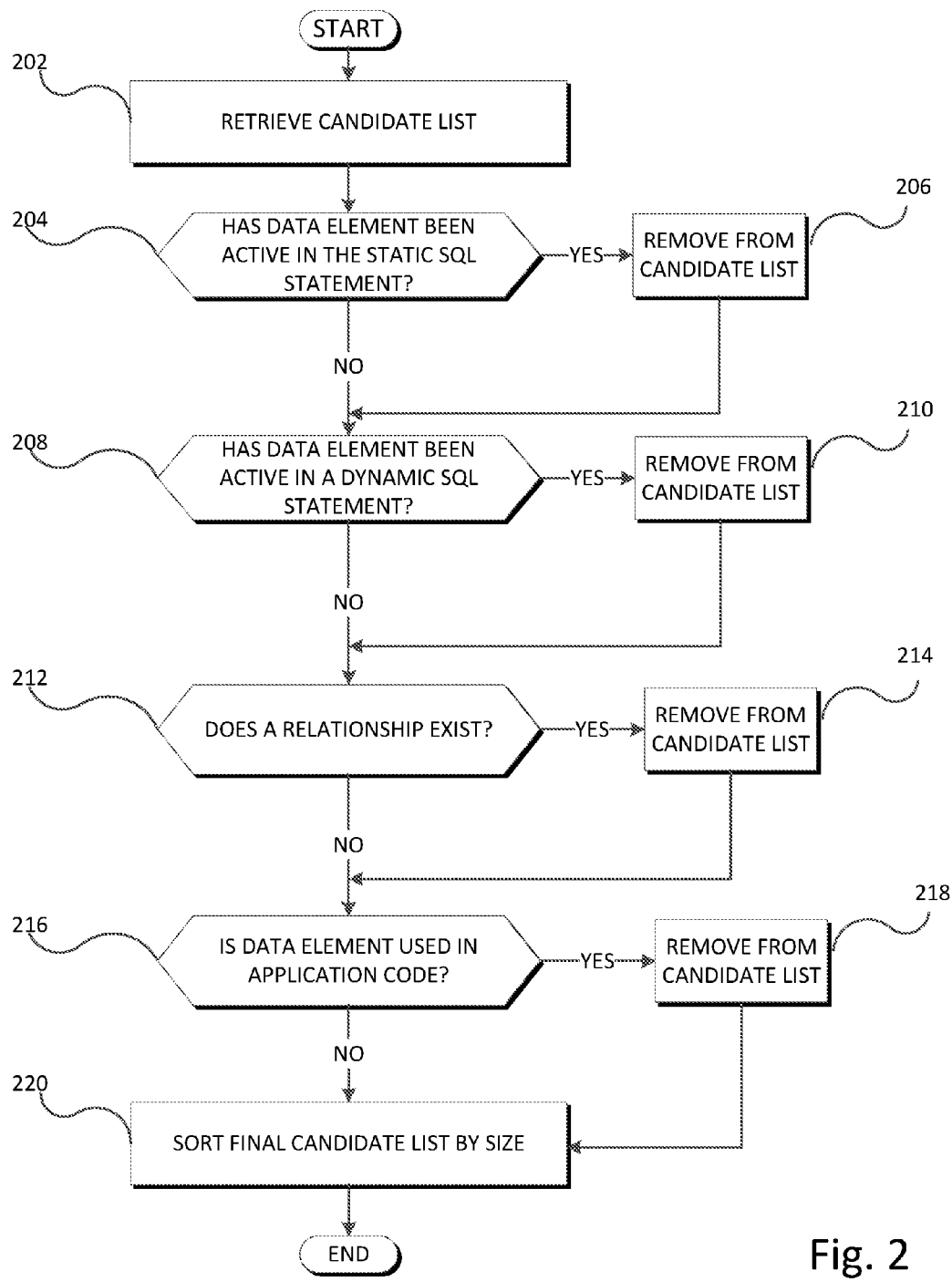
FIG. 2 is a flowchart illustrating the operations of a database storage reclaiming program of FIG. 1 in determining where and how much storage of a database can be reclaimed, in accordance with an embodiment of the invention.

FIG. 2 is a flowchart depicting the operation of storage reclaiming program 116 in determining which data elements of a database are inactive and sorting them by size, in accordance with an embodiment of the present invention. In the example embodiment where database catalog 115 stores metadata relating to database 112, storage reclaiming program 116 retrieves a list of candidates for deletion by referencing database catalog 115 to retrieve an exhaustive list of every data element stored in database 112, known as the list of candidates for deletion or simply the list (step 202). Although the resulting list of candidates for deletion may also include important and/or frequently used data elements, active data elements may be filtered off of the list as described below.

Storage reclaiming program 116 determines whether data elements on the list of candidates for deletion are active in static SQL statements within the relevant period of time (decision 204). A static SQL statement is defined as a SQL statement in an application that does not change at runtime and can be hard-coded into an application. Static SQL statements are application specific and define the manner in which the application interacts with the data elements in database 112. Each time a data element contained in database 112 is active in a static SQL statement, database management system 114 registers the data element, the date of use, and the time of use. In order to determine which data elements are active within the relevant time period, storage reclaiming program 116 cross references the times and dates of registered data element use with the data elements on the list of candidates for deletion. If a data element has been used in a static SQL statement within the relevant period of time (decision 204 "YES" branch), then the data element is considered active and is removed from the list of candidates for deletion (step 206). If a data element has not been used in a static SQL statement within the relevant period of time (decision 204 "NO" branch), the data element is considered inactive and remains on the list as a candidate for deletion. Because data element use must first be registered before storage reclaiming program 116 can determine whether the data element is active, the relevant period of time is retroactive and set to one (1) year by default. In other embodiments, however, the period of time can be adjusted by the user to go back as far as desired.

Storage reclaiming program 116 determines whether any data elements on the list of candidates for deletion are active in a dynamic SQL statement over the relevant period of time (decision 208). Unlike static SQL statements which are hard-coded, dynamic SQL statements are constructed at runtime and are, therefore, not hard-coded into an application nor registered by database management system 114. As a result, dynamic SQL statements are temporary and must be captured as they are used and before they are discarded. Therefore, determining whether data elements are active in dynamic SQL statements requires proactively monitoring database 112 for a relevant period of time, a process also known as workload monitoring. Workload monitoring involves recording all requests made by external clients to database 112 and storing them in binary files, known as capture files. The capture files contain relevant information about the client request, such as SQL text, bind values, and transaction information. Storage reclaiming program 116 cross references the information obtained by workload monitoring with the data elements on the list of candidates for deletion to determine which data elements are active. The relevant period of time for performing a dynamic analysis is, by default, six months, however the duration can be varied based on the business. If a data element has been used in a dynamic SQL statement within the relevant period of time (decision 208 "YES" branch), then the data element is considered an active data element and is removed from the list (step 210). Conversely, if a data element has not been used in a dynamic SQL statement within the relevant period of time (decision 208 "NO" branch), then the data element is considered inactive and remains on the list as a candidate for deletion.

Storage reclaiming program 116 determines if data elements on the list of candidates for deletion maintain a relationship with any data elements not on the list (decision 212). Storage reclaiming program 116 determines whether a relationship exists by cross referencing the data elements on the list of candidates for deletion with relationship information of the data elements contained in database catalog 115. While the static and dynamic analyses remove from the list any data elements that have been used directly in an SQL statement, this analysis ensures that no data elements on the list are indirectly depended on by another data element. If a relationship exists (decision 212 "YES" branch), then the data element is considered active and is removed from the list (step 214). If storage reclaiming program 116 determines that no relationship exists (decision 212 "NO" branch), the data element remains on the list as a candidate for deletion. For example, a foreign key may be present on the list of candidates for deletion even though it may be a necessary reference for other applications to operate properly. Storage reclaiming program 116 identifies that the foreign key is depended on by another data element and removes the data element corresponding to the foreign key from the list of candidates for deletion. Another example may include a View object which references data elements in the columns of a table, creating a relationship between the View object and referenced data elements in the columns of the table. Furthermore, a Trigger object may maintain a relationship with a set of SQL statements that are triggered when a particular SQL operation occurs, such as adding a date automatically.

Storage reclaiming program 116 determines whether any data elements on the list of candidates for deletion are used in application code (decision 216). The application code a user wishes to analyze are specified by user input via a user interface on database server 110 such that the user may choose to analyze only the important and frequently used applications for a quicker analysis or, conversely, the user may choose to analyze every application contained on database server 110. Storage reclaiming program 116 determines whether a data element on the list is used in application code by analyzing the user selected application code and workload logic to extract SQL statements and then cross referencing them with the data elements on the list of candidates for deletion. Similar to an impact and dependency analysis, performing a code inspection ensures that although no data elements on the list are used directly in an SQL statement, the data element is also not depended on or in a relationship with a program application. If a data element on the list of candidates for deletion is used in the SQL statements of relevant application code (decision 216 "YES" branch), then the data element is considered active and is removed from the list (step 218). If a data element is not used in any relevant application code (decision 216 "NO" branch), then the data element is considered inactive and remains on the list of candidates for deletion.

Storage reclaiming program 116 sorts the remaining data elements on the list of candidates for deletion by size (step 220). In the example embodiment, the list of candidates for deletion is sorted in descending order such that the data elements providing the most potential memory to reclaim through deletion are display first. In other embodiments, the list may be sorted based on other factors.

Figure 3:
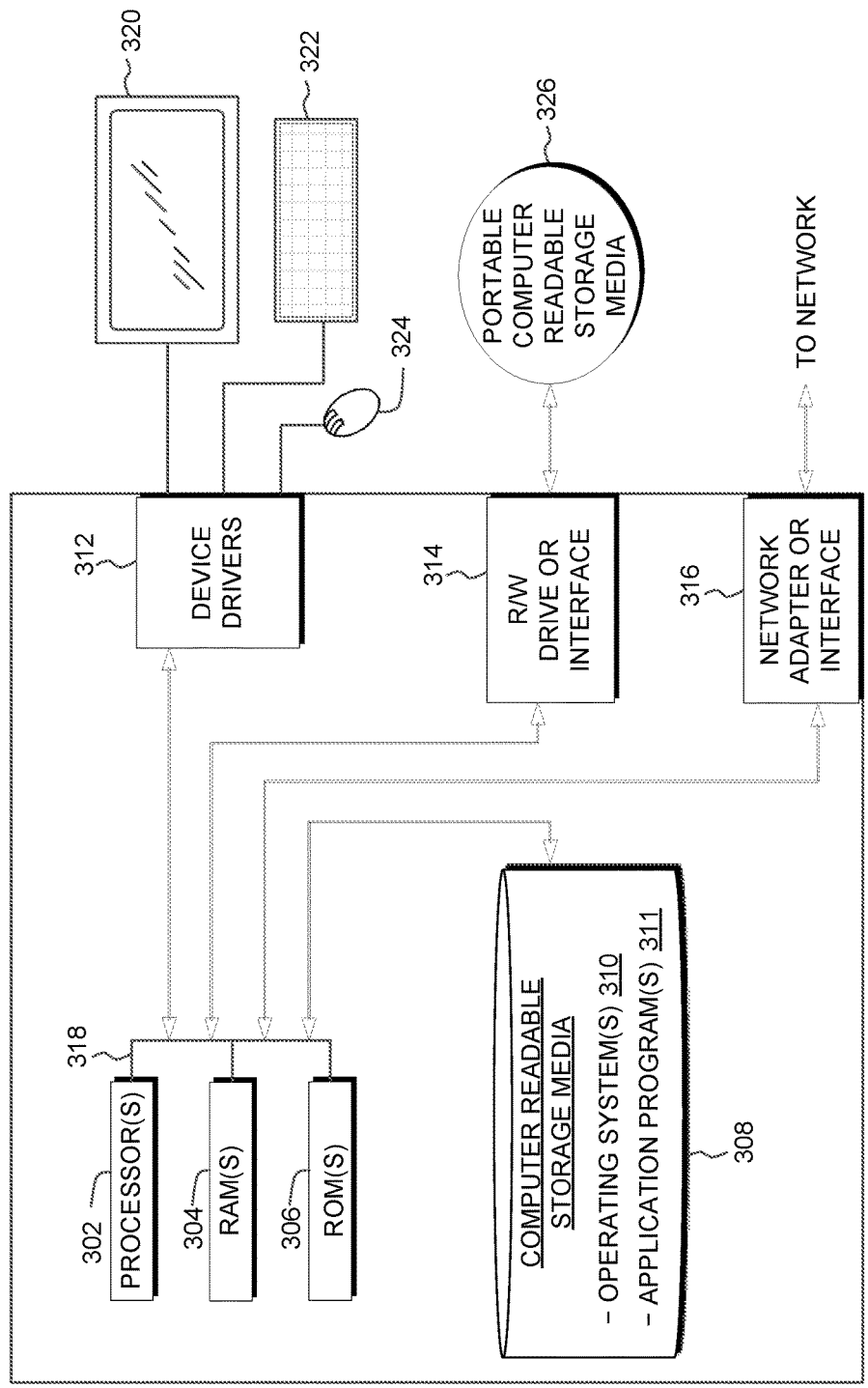
FIG. 3 is a block diagram depicting the hardware components of a database storage reclaiming system of FIG. 1, in accordance with an embodiment of the invention.

FIG. 3 depicts a block diagram of components of database server 110 of a database storage reclaiming program system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Database server 110 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311, for example, storage reclaiming program 116, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Database server 110 may also include a R/W drive or interface 314 to read from and write to one or more portable computer readable storage media 326. Application programs 311 on database server 110 may be stored on one or more of the portable computer readable storage media 326, read via the respective R/W drive or interface 314 and loaded into the respective computer readable storage media 308.

Database server 110 may also include a network adapter or interface 316, such as a TCP/IP adapter card or wireless communication adapter (such as a 4G wireless communication adapter using OFDMA technology). Application programs 311 on database server 110 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Database server 110 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for a database storage reclaiming program, the computer program product comprising:
    one or more computer-readable storage media and program instructions stored on the one or more computer-readable storage media, the program instructions comprising:
    program instructions to retrieve a list of one or more data elements contained in a database;
    program instructions to detect utilization of a first data element on the list of one or more data elements in a static Structured Query Language (SQL) statement, wherein static SQL statements are persistent and being created before runtime;
    based on the detecting utilization of the first data element on the list of one or more data elements in the static SQL statement, program instructions to create a record associated with the first data element detailing a time at which the first data element was utilized in the static SQL statement;
    program instructions to detect utilization of a second data element on the list of one or more data elements in a dynamic SQL statement, wherein dynamic SQL statements are non-persistent and being created at the runtime;
    based on the detecting utilization of the second data element on the list of one or more data elements in the dynamic SQL statement, program instructions to create a capture file associated with the second data element detailing a time at which the second data element was utilized in the dynamic SQL statement;
    program instructions to receive a retroactive time period from a user, wherein the retroactive time period comprises a starting point of time in the past;
    program instructions to determine whether the first data element has been utilized in the static SQL statement within the retroactive time period by comparing the time detailed by the record with the retroactive time period;

based on determining that the first data element has been utilized in the static SQL statement within the retroactive time period, program instructions to remove the first data element from the list of one or more data elements;

program instructions to determine whether the second data element has been utilized in the dynamic SQL statement within the retroactive time period by comparing the time detailed by the capture file with the retroactive time period;

based on determining that the second data element has been utilized in the dynamic SQL statement within the retroactive time period, program instructions to remove the second data element from the list of one or more data elements;

program instructions to receive a list of one or more applications from the user;

program instructions to analyze application code associated with each of the one or more applications to extract one or more application code SQL statements;

program instructions to determine whether a third data element on the list of one or more data elements has been utilized in the extracted one or more application code SQL statements within the retroactive time period;

based on determining that the third data element on the list of one or more data elements has been utilized in the one or more application code SQL statements within the retroactive time period, program instructions to remove the third data element from the list of one or more data elements.

* * * * *